2 Sheets—Sheet 1.

L. C. ROYER.
GRAIN SEPARATOR.

No. 179,064. Patented June 20, 1876.

Witnesses:
C. Clarence Poole
W. J. Collamer

Inventor:
Louis C. Royer
per atty A. H. Evans & Co.
Washington
D.C.

N. PETERS, PHOTO-LITHOGRAPHER, WASHINGTON, D.C.

L. C. ROYER.
GRAIN SEPARATOR.

No. 179,064.

2 Sheets—Sheet 2.

Patented June 20, 1876.

Witnesses:
C. Clarence Poole
N. I. Wallamer

Inventor:
Louis C. Royer
per atty. A. H. Evans & Co
Washington
D.C.

N. PETERS, PHOTO-LITHOGRAPHER, WASHINGTON, D. C.

UNITED STATES PATENT OFFICE.

LOUIS C. ROYER, OF INDIANAPOLIS, INDIANA.

IMPROVEMENT IN GRAIN-SEPARATORS.

Specification forming part of Letters-Patent No. 179,064, dated June 20, 1876; application filed June 9, 1876.

*To all whom it may concern:*

Be it known that I, LOUIS C. ROYER, of Indianapolis, Indiana, have invented certain Improvements in Grain-Separators, of which the following is a clear, full, and exact description, reference being had to the accompanying drawings, making a part of this specification, in which—

Figure 1:
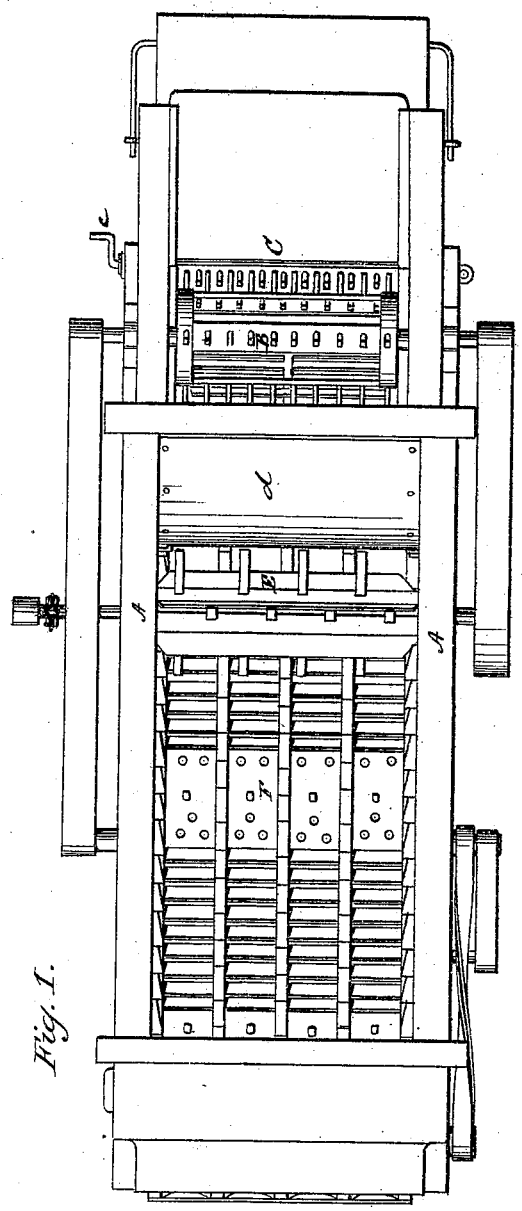
Figure 2:
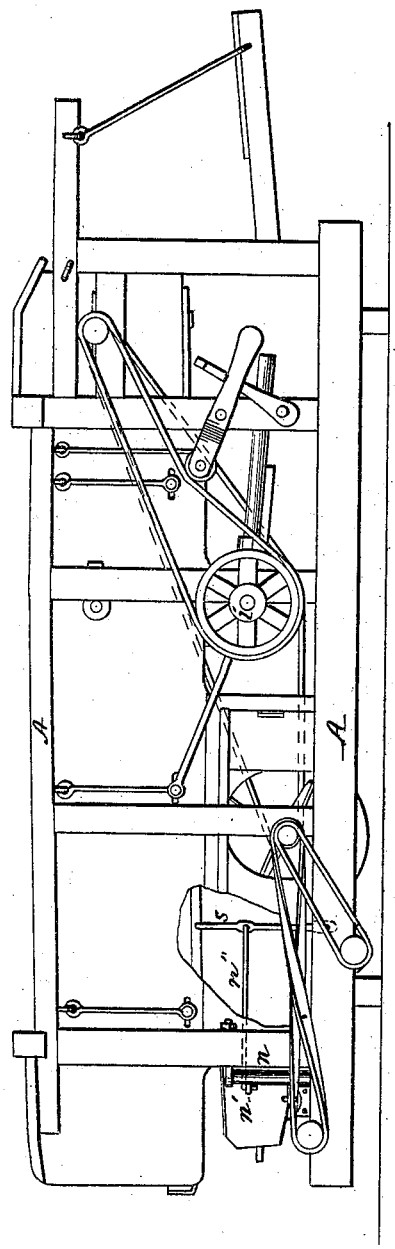
Figure 3:
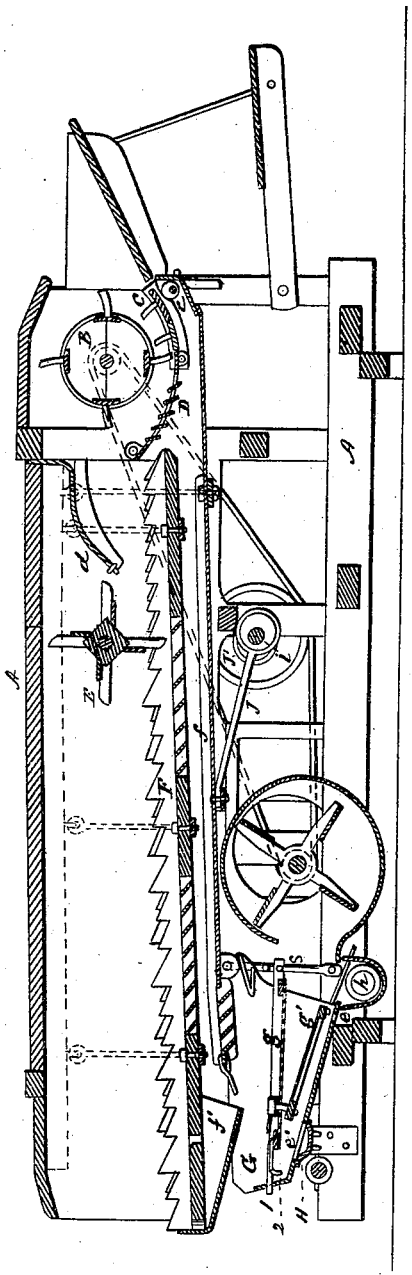
Figure 5:
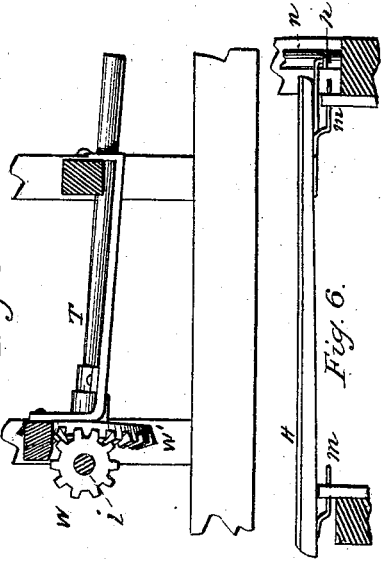
Figure 6:
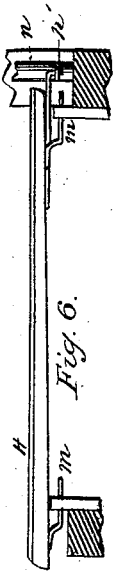
Figure 4:
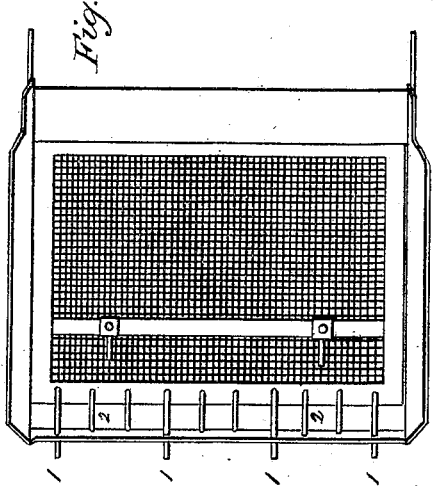

Figure 1 is a plan view of a separator with my improvements attached. Fig. 2 is a side elevation of the same. Fig. 3 is a longitudinal vertical section. Fig. 4 shows the sieves and riddle-box. Fig. 5 shows the bevel-gear below the separator. Fig. 6 shows the return-spout.

My invention relates to that class of separators used, in connection with thrashers, to separate the grain from the straw; and it consists in the several combinations and arrangements of parts hereinafter fully described and claimed, and is an improvement on Patent No. 167,570, issued to me on the 7th day of September, 1875.

To enable others skilled in the art to make and use my invention, I will proceed to describe the exact manner in which I have carried it out.

In the drawings, A represents the framework of a separator, in which is secured the toothed cylinder B, below which are placed the concave toothed bed C and grating D. The bed C is adjusted or regulated by means of eccentric rollers c placed just below its front edge. The straw-director d is so curved as to direct the straw below the rotary rake E and along the shaker F. The rotary rake E is secured within the frame by means of the removable shaft E', by which construction I am enabled to remove the rake from the frame whenever desirable, as is the case when flax and some other products are being thrashed. The teeth of the rake are made straight, and are rounded on the beating or striking edges of the ends, in order to avoid wrapping with the straw. In the construction of my improved shaker F the teeth are made of irregular lengths, with a view to raising and lowering the straw as it passes over, and by this irregular motion given to the straw, to separate from it the more completely the loosened grain. I find that raising every third tooth on a bar, and alternating these on the several bars, produces a good effect. In the bottom of the shaker I find it desirable to give greater space between the slats immediately below and near the rotary rake than between the slats further in the rear, as the rush of grain is greater at that particular point than it is rearward.

Heretofore I have made the return-receiver $f'$ sliding into the rear end of the shaker F, but this construction I have found to be faulty, as the slides would work loose, and were not sufficiently substantial to stand the jarring of the machinery. To overcome this difficulty I construct the return-receiver by attaching it rigidly to the rear end of the shaker, as shown in Fig. 3. Below the shaker F is located the grain-receiver $f$, which receives its oscillating motion from an eccentric, J, on the shaft $i$, which carries the gear-wheel W, meshing into the bevel-gear wheel W' on the power-shaft T. Two other eccentrics, J', on the same shaft $i$, give motion to the shaker F, as shown in Fig. 3. Below the rear end of the grain-receiver is placed the sieve and riddle-box G containing the riddle and sieve $g$ $g'$. This box remains stationary, while the riddles connect with the stirrup $s$ attached to the grain-receiver, and through the latter receive their shaking or oscillating motion. The bottom of the riddle-box is provided with two slots or openings, $e$ and $e'$, the latter opening into the return-spout H and the former into any receptacle provided for the reception of the screenings. The return-spout H is attached to the vertical shaft $n$, which is provided with two short horizontal arms, $n'$, one of the arms being attached to the stirrup $s$ by means of the rod $n''$, thereby receiving reciprocating motion from the grain-receiver F. This spout delivers the grain which enters it to elevators, which carry it back to the cylinder to be again passed through the machine.

The rear of the riddle is provided with a series of projections, 1 and 2, as shown in Fig. 3, those numbered 1 extending rearward horizontally and, passing through suitable openings in the rear of the riddle-frame, act as guides to the riddles in their oscillations, while those numbered 2 are bent downward to form a rake for moving the tailings, which might otherwise choke the free movement of the riddles by falling in behind them.

Having thus described my invention, what I claim as new, and desire to secure by Letters Patent, is—

1. The removable rotary rake E, provided with straight teeth, rounded on their beating-edges, substantially as and for the purpose set forth.

2. The riddle-box G, provided with the openings $e\ e'$, in combination with the riddles $g\ g'$, provided with the guides 1 and fingers 2, substantially as and for the purpose set forth.

3. The riddles $g\ g'$, with a riddle-box, G, having the openings $e\ e'$, and provided with the fingers 2, in combination with the stirrup $s$, connected with the riddles, rod $n''$, and vertical shaft $n$, provided with the arms $n'\ n'$, substantially as set forth.

4. The return-spout H, provided with the guides $m$, in combination with the vertical shaft $n$, having the arms $n'\ n'$, connecting-bar $n''$, stirrup $s$, and receiver F, substantially as and for the purpose set forth.

LOUIS C. ROYER.

Witnesses:
THOMAS C. CONNOLLY,
B. H. WEST.